Aug. 27, 1946.   E. R. PATCHEN   2,406,628
APPARATUS FOR FORMING SKIS, ETC
Filed Jan. 20, 1944
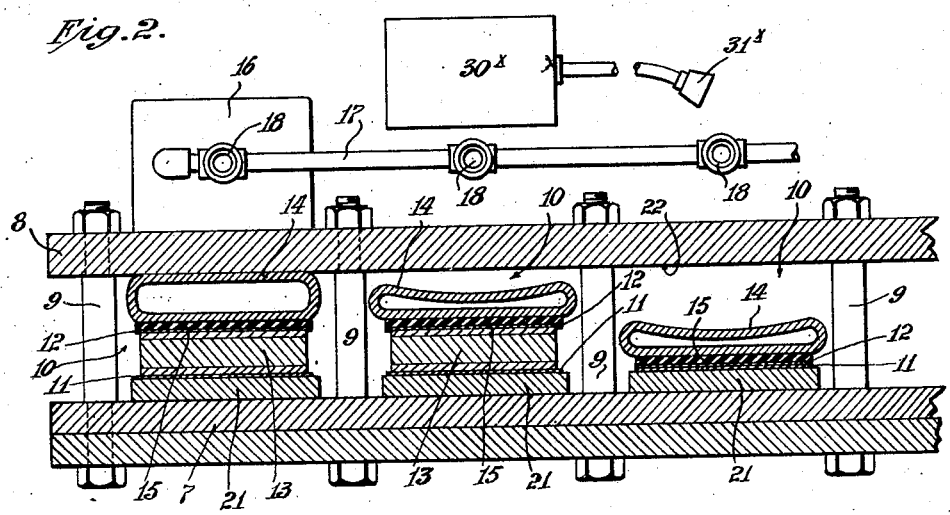
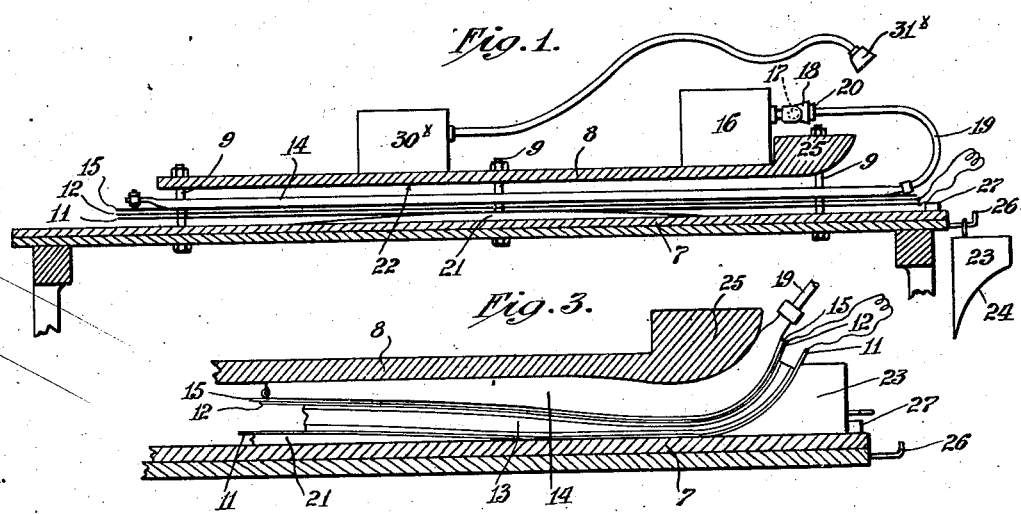
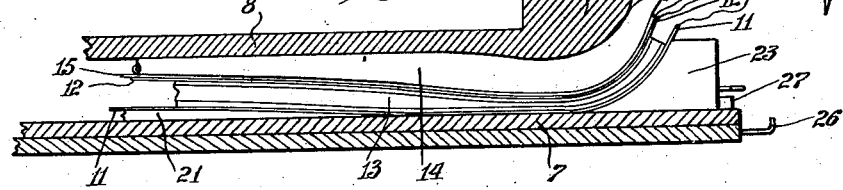
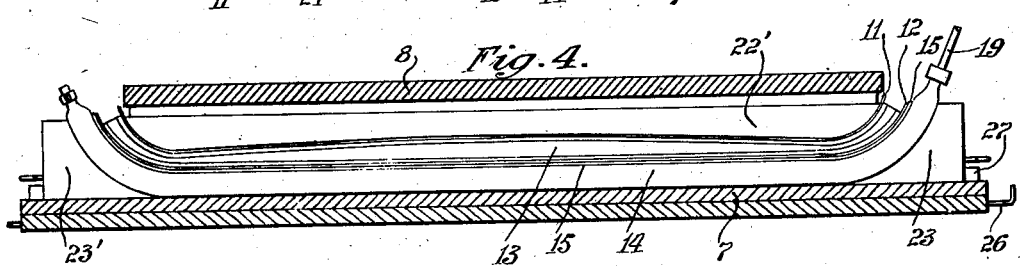
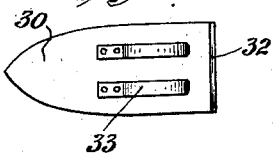 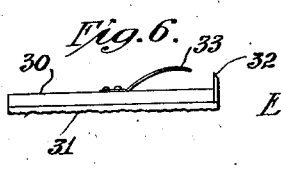
INVENTOR
E'lester R. Patchen
BY
ATTORNEY Patented Aug. 27, 1946

2,406,628

UNITED STATES PATENT OFFICE 2,406,628

APPARATUS FOR FORMING SKIS, ETC.

Elester R. Patchen, Lakeville, Conn., assignor to Local Industries, Incorporated, Lakeville, Conn., a corporation of Connecticut Application January 20, 1944, Serial No. 518,965

6 Claims. (Cl. 144—281)

My invention relates particularly to the manufacture of wooden skis but is applicable to the manufacture of other plywood articles and in fact to the shaping of solid wooden skis.

The main object is to provide a system and apparatus which are applicable to effective and high speed production methods at minimum costs.

Another object is to secure uniform results with simple and inexpensive apparatus and requiring a minimum skill of workers.

Another object is to provide a system and apparatus which can be readily modified to handle different sizes and produce different shapes of articles.

Various features of the invention have been tried before but so far as I am aware the combination herein set forth is new and assuredly the invention has proved to be a great improvement over previous commercial methods.

In its simplest form the apparatus comprises two rigid abutments, i. e. a floor or table element and a fixed ceiling abutment element spaced above it and with a series of forming units between the abutments. Each unit has a heavy flexible rubber lined hose and one or more flexible metal electrical resistance heater strips or plates. Preferably there are two plates between which the material to be formed is inserted. These plates rest upon the table and the flexible hose is interposed between the top plate and the ceiling or upper abutment. When one end of the article is to be curved upwardly a block having a concavely curved supporting surface is inserted between the table and one end of the lower plate. A source of compressed air is provided to which each hose is connected when it is desired to form the material and at the same time current is passed through the plate or plates so as to heat the adjacent material. The heat, pressure and time required for setting the material will depend upon the work to be done. With heater plates above and below the top and bottom layers, a temperature of 200° F. and a pressure of 100 lbs. per square inch for 10 minutes is sufficient to permanently set the wood and waterproof adhesive used in forming 3-ply skis. As each unit is loaded or filled with the material to be formed, air pressure is applied so that the units are brought into operation successively. When each unit has been in operation the desired time its hose is detached from the air compressor and connected to a suction device so as to collapse the hose and facilitate the withdrawal of the formed material. With such an arrangement three men can load and unload a machine with ten units successively at the rate of about one unit per minute. The heating plates and the hose being quite flexible it is possible to compress strips of wood against various outlines or forms of the abutments with the same plates.

Fig. 1 is a side view of a simple form of my apparatus showing the parts in the inactive or unloaded position.

Fig. 2 is a transverse sectional view showing a number of units, one in which the hose is collapsed and with no ski material in place, one in which material is inserted ready for the application of air pressure and one in which pressure is on.

Fig. 3 is a side view similar to Fig. 1 but showing ski material in place and under forming pressure.

Fig. 4 is a side view showing a modified form of the apparatus for curving both ends of the ski or other material.

Figs. 5 and 6 are views of a device for scraping or clearing out any glue which may have fallen between the heating plates.

The floor or table abutment 7 may be formed of two or more layers of wood and should be quite rigid. The ceiling or upper abutment 8 should also be quite rigid so that it can not become distorted. These two parts are connected by tie bolts 9 which need not be adjustable after once being fixed. These bolts are arranged in rows with narrow spaces 10 between adjacent rows. In each space is a pair of flexible metal plates 11 and 12 of suitable resistance material such as stainless steel connected in series to a suitable source of current (not shown) for heating them. Between these plates is inserted endwise the ski material 13. When these are to be made of plywood, a suitable waterproof glue or cement is applied between the adjacent layers such as a phenolic condensation or other product capable of being quickly hardened by heat and pressure.

Above the top plate of each pair is inserted a flexible hose section 14 such as heavy fire hose with a rubber lining. For a ski 4 inches wide the metal plates should be about 4¼" wide and the hose about 3" in diameter inside. Such a hose is about 5" wide outside when collapsed. The metal plates may be about .025" thick and the length a little longer than the work to be formed.

For a single ski unit of 8' length and 4" wide the current may be at 3 volts and 300 amperes and for ten ski units—30 volts and 300 amperes. At normal conditions 10 minutes is sufficient to set a ski form when the plates are kept heated to about 200° F. and the air pressure maintained at about 100 to 120 pounds per square inch. An insulating strip 15 is preferably inserted between the upper plate 12 and the hose to prevent damage.

A suitable source 16 of air pressure has a distributing pipe 17 with an automatic coupling 18 adjacent each pressure hose. Each hose has a flexible tube 19 connected at one end and is closed at the other end. This tube has an automatic coupling 20. These couplings of conventional form are so constructed that 18 is normally closed and adapted to open automatically when 20 is inserted into it.

A shim 21 is inserted beneath each metal plate 11 and of such shape as to form the proper camber at the proper place in the bottom of the ski blank. The upper abutment may be either flat or arched at its lower face 22. The use of the flexible air hose as the pressure means affords a wide range of adaptation to changes in form.

When a ski or other curved ended article is to be formed a removable toe block 23 with a concave face 24 is employed and the end 25 of the upper abutment has approximately the same curved lower face. When not in use the toe block may be hung on a hook 26 at the end of its unit and when in use a stop 27 serves to properly locate the toe block and prevent its longitudinal displacement. The table is made long enough at the opposite end 28 to accommodate a scraper 30 which is pushed through between the plates as the ski material is inserted endwise, the purpose being to remove any glue or cement that may have dropped off from the previous ski material. The bottom is covered with a piece of fabric such as carpet 31 and the rear end has a scraper flange 32. A spring or springs 33 presses the scraper down against the lower plate and the flange 32 scrapes the upper plate.

Each unit is loaded, one after the other, by inserting the material to be heated between the respective pairs of resistance plates previously heated and maintained heated. Each is placed under pressure at once and left under pressure for a suitable time. An economical system employs 10 units so that they may be kept in use by rotation from one to the other and back again. With such a type of apparatus two or more sizes or shapes may be made at the same time by suitably forming the shims and toe plates.

The hose 14 being quite stiff and the parts being so positioned as to permit the hose to exert pressure when blown up, it is necessary to at least partially collapse the hose in order to remove the finished blank. When the work is finished the tube 19 is disconnected from the air source 16 and its outlet 18. This allows the air to escape from the hose but on account of its stiffness the hose still exerts considerable pressure. I accordingly provide a source $30^x$ of suction or sub-atmospheric pressure with an intake coupling $31^x$ normally closed. When the pipe 19 is disconnected from pressure source 16 it is immediately connected to the coupling $31^x$. A vacuum of 10″ of mercury is sufficient to produce the necessary deflation and collapse.

When a double ended ski for supporting a heavy vehicle or gun or other device is to be made the hose 14 may rest directly on the table 7. In this case the upper forming surface is carried by the removable part 22′ which is adapted to be slid into and out of place between the upper and lower abutments. An additional toe block 23′ is also required and the heating plates are inserted between the hose 14 and the form 22′. The wood is inserted between the heating plates before the blocks 23 and 23′ are inserted and then pressure is applied. When the material has set the blocks are removed and the material withdrawn together with the upper form 22′.

Skis are sometimes made of a single strip of wood and sometimes of two, three or more layers glued together. When making a ski of two or more plies it is quite necessary that all the plies or layers be equally dry or have the same minimum moisture content. By my process the heat softens the wood and its contained resinous substances so that it can be shaped at the toe and given the proper camber to any desired curves. This is true even with one-piece or solid skis. It is therefore unnecessary to steam the ski or other device as is usually done in order to shape it.

When the piece or plywood to be shaped is too broad to be held by a single hose section, a number may be laid side by side. By the use of this invention it will be seen that it is unnecessary to employ heavy presses nor is it necessary to operate a large number of bolts or clamps as has been customary.

As an example of the speed and efficiency of such a press in making plywood skis it is quite practical for four men working continuously to apply the glue or adhesive liquid such as Bakelite and assemble the parts, insert the parts and apply the air pressure to ten units consecutively while the plates are continuously heated, then deflate or collapse the hose elements consecutively and remove the formed ski-blanks and replace them with the parts which have just been glued and thus produce the formed and set blanks at the rate of 50 to 60 per hour. Such a press is inexpensive to construct and simple and inexpensive to operate and maintain. The parts can be readily changed so as to form various sizes of skis and so as to produce different cambers and locations of camber and different toe forms. This process may be operated with uniformity regardless of the temperature and humidity in the shop.

The temperature and time of pressure may vary considerably depending upon the particular glue or cement employed. Obviously the temperature should not be so high as to injure the wood. With lower temperature it may take longer for the parts to set properly.

The adhesive between layers or plies may be in liquid form or in the form of fabrics impregnated with thermoplastic or polymerizable compounds. Thin layers of wood may be given desired forms without preliminary steaming. The formation of heavier material may be facilitated by a certain amount of steaming. The final setting however in all cases is greatly expedited by the use of heat and pressure as herein set forth.

For forming skis the inside diameter of the hose should be from 70% to 90% of the width of the ski to allow for the flattening action of the hose under pressure which must be distributed uniformly over the width of the ski material. For a four inch width of ski the hose is preferably from 3″ to 3½″ in inside diameter. This should take care of the variation in thickness of the ski from the center toward the toe and heel portions. The lateral stiffness of the upper heating plate and the protective insulation above it make it possible to distribute the pressure laterally and therefore use somewhat smaller hose than would be possible with more laterally flexible plate and insulation. If the hose is too small it can not apply pressure properly throughout the width of the ski and if it is too large it is likely to bulge over the edges of the insulation and the heating plate and become damaged when pressure is applied.

The vertical space or clearance between the floor and ceiling must of course accommodate the article plus the heating plates and the hose. With a given size of hose the clearance required is less for a thin article than for a thicker one.

I have found that a clearance of 2½" to 3" will accommodate a 4" ski and a 3" hose. When a shim is employed between the toe and heel to provide for a central camber there may be less clearance between the top of the shim and the bottom of the ceiling. On the other hand a part of the ceiling may be extended downward above the thin portions of the ski near the toe and heel so as to produce a more uniform compression of the hose.

By this apparatus and method when the air connection is made to a hose section the hose is expanded and due to the inherent stiffness of the hose pressure is applied gradually from along the central portion outwardly toward the opposite edges so that any excess of the adhesive is squeezed outwardly and not entrapped as may be the case when pressure is applied by an ordinary power press or by clamp bolts along the sides as in the prior art. The use of a flexible pneumatic hose makes it possible to apply a uniform pressure throughout the entire length of the ski, including the upturned toe portion.

I claim:

1. In a forming machine, a pressure and heating unit comprising a table and a fixed abutment spaced apart therefrom, a flexible hose section and a flexible electric heating plate supported by said table beneath said abutment, a discrete toe block having a concave forming surface adapted to be inserted on the table beneath one end of the heating plate, a source of compressed air connected to said hose for expanding the hose and compressing material inserted adjacent said heating plate, means for passing an electric current through said plate and heating the material while it is being compressed by said hose and means for reducing the pressure in the hose below atmospheric pressure so as to collapse the hose and relieve the material and permit it to be withdrawn.

2. In a forming machine, a pressure and heating unit comprising a stationary supporting table and an upper fixed abutment spaced apart therefrom, a flexible collapsible hose section and a heating plate supported by said table beneath said abutment, a removable toe block having a concave forming surface adapted to be inserted on the table beneath one end of the heating plate, a source of compressed air for expanding the hose and compressing material inserted against said heating plate, and means for passing an electric current through the plate and heating the material while it is being compressed by said hose.

3. A ski press comprising a rigid table, a fixed abutment supported above the table, two rows of tie bolts connecting the abutment to the table, a shim on the table, a toe block removably supported between the rows of tie bolts and a flexible hose between the table and the abutment and means for applying air pressure to the hose.

4. In a forming machine, a pressure and heating unit comprising a supporting table and an upper abutment spaced apart therefrom, a flexible collapsible hose section and two heating plates supported by said table beneath said abutment, a removable toe block having a concave forming surface adapted to be inserted on the table beneath one end of the heating plates, a source of compressed air adapted to be connected to said hose for expanding the hose and compressing material inserted between said heating plates, and means for passing an electric current through the plates and heating the material while it is being compressed by said hose.

5. In a forming machine, a pressure and heating unit comprising a table and a fixed abutment spaced apart therefrom, a hose section and two heating plates supported by said table beneath said abutment between which plates the material to be formed is inserted, a discrete toe plate having a concave forming surface adapted to be inserted on the table beneath one end of the heating plates, a source of compressed air connected to said hose for expanding the hose and compressing material inserted between said heating plates, means for passing an electric current through the heating plates and heating the material while it is being compressed by said hose and means for reducing the pressure in the hose below atmospheric pressure so as to collapse the hose and relieve the material and permit it to be withdrawn.

6. Apparatus for forming a multiply ski which comprises upper and lower fixed abutments, pairs of posts connecting the abutments at intervals along the opposite sides of the abutments, the upper abutment having a convex wall at one end, a removable block having a concave face adapted to be inserted beneath said concave wall under the lower side of the assembled ski-plies and bend the tips thereof, a flexible hose extending longitudinally between the abutments, means for applying air pressure within said hose to expand it and to press the ski-plies together, means for reducing the air pressure in the hose below atmospheric pressure and for collapsing the hose so as to release the inserted ski parts and permit the assembled ski-parts to be withdrawn longitudinally from between the fixed abutments.

ELESTER R. PATCHEN.